(12) United States Patent
Lloyd et al.

(10) Patent No.: US 12,497,939 B2
(45) Date of Patent: Dec. 16, 2025

(54) METHOD OF STARTING A COMPRESSION IGNITION ENGINE

(71) Applicant: Caterpillar Inc., Peoria, IL (US)

(72) Inventors: Thomas E. Lloyd, Peterborough (GB); Christopher J Crawford, Peterborough (GB); Qiancheng Ma, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/861,670

(22) PCT Filed: Apr. 28, 2023

(86) PCT No.: PCT/US2023/020297
§ 371 (c)(1),
(2) Date: Oct. 30, 2024

(87) PCT Pub. No.: WO2023/229789
PCT Pub. Date: Nov. 30, 2023

(65) Prior Publication Data
US 2025/0283443 A1    Sep. 11, 2025

(30) Foreign Application Priority Data
May 25, 2022   (GB) ...................................... 2207693

(51) Int. Cl.
*F02N 19/06*        (2010.01)
(52) U.S. Cl.
CPC .................................... *F02N 19/06* (2013.01)

(58) Field of Classification Search
CPC ......... F02N 19/06; F02D 41/06; F02D 41/064
See application file for complete search history.

(56) References Cited

U.S. PATENT DOCUMENTS 3,485,226 A    12/1969   Arendt et al.
4,297,742 A    10/1981   Heitzman et al.
(Continued)

FOREIGN PATENT DOCUMENTS

GB     1523851 A       9/1978
IN  201941047666 A     5/2021
(Continued)

OTHER PUBLICATIONS

International Search Report related to Application No. PCT/US2023/020297; reported on Jul. 19, 2023.
(Continued)

*Primary Examiner* — Grant Moubry

(57) ABSTRACT

A method of starting a compression ignition engine is provided. The method comprises using a glow plug of the compression ignition engine to perform a warm up routine to preheat the compression ignition engine. During the warm up routine, a fuel rack actuator of the fuel rack is actuated which controls the quantity of fuel to be injected into the compression ignition engine such that the fuel rack is in a start-up fuel injection position by the end of the warm up routine. Following the end of the warm up routine, the compression ignition engine is cranked until the compression ignition engine starts, wherein the fuel rack actuator maintains the start-up fuel injection position of the fuel rack until the compression ignition engine has started.

16 Claims, 4 Drawing Sheets

(56) References Cited

U.S. PATENT DOCUMENTS 4,846,125 A * 7/1989 Hareyama ............... F02B 19/02
123/255
4,867,115 A * 9/1989 Henein ................ F02D 41/064
123/179.17

FOREIGN PATENT DOCUMENTS

| JP | S63246420 A | 10/1988 |
| JP | 2000345948 A | 12/2000 |
| JP | 5166067 B2 | 3/2013 |
| JP | 5865219 B2 | 2/2016 |
| WO | 2021186461 A1 | 9/2021 |

OTHER PUBLICATIONS

Great Britain Search Report related to Application No. 2207693.9; reported on Oct. 28, 2022.

* cited by examiner

METHOD OF STARTING A COMPRESSION IGNITION ENGINE

CROSS-REFERENCE TO RELATED APPLICATION

This Application is a 35 USC § 371 US National Stage filing of International Application No. PCT/US2023/020297 filed on Apr. 28, 2023 which claims priority to Great Britain Patent Application No. 2207693.9 filed on May 25, 2022.

FIELD OF THE DISCLOSURE

The present disclosure relates to compression ignition engines. In particular, the present disclosure relates to the start-up of a compression ignition engine.

BACKGROUND

Compression ignition engines, including diesel engines, rely on compression of air to raise the temperature of the air sufficiently such that it combusts when mixed with fuel. On start-up of a compression ignition engine, when the engine is relatively cold, achieving sufficient temperature of the air through compression alone can be challenging.

Often, compression ignition engines comprise one or more glow plugs which are configured to pre-heat the combustion chamber for a predefined time duration. For example, IN-A-2019 41047666 discloses a method for achieve cold-start of a diesel compression ignition engine fitted with an inline mechanical fuel pump. The method comprises the steps of energizing a glow plug for pre-heating the combustion chamber of the diesel engine for a pre-defined duration of time followed by actuating a fuel pump solenoid for injecting a pre-defined quantity of fuel into the combustion chamber of the internal combustion engine of a vehicle. Further, the method enables a user to crank the internal combustion engine of a vehicle upon actuating the fuel pump solenoid.

Against this background, the present disclosure aims to provide an improved, or at least a commercially useful alternative, method of starting a compression ignition engine, a compression ignition engine controller, and a compression ignition engine.

SUMMARY

According to a first aspect of the disclosure, a method of starting a compression ignition engine is provided. The method comprises:
  using a glow plug of the compression ignition engine to perform a warm up routine to preheat the compression ignition engine;
  during the warm up routine, actuating a fuel rack actuator of the fuel rack which controls the quantity of fuel to be injected into the compression ignition engine such that the fuel rack is in a start-up fuel injection position by the end of the warm up routine; and
  following the end of the warm up routine, cranking the compression ignition engine until the compression ignition engine starts,
  wherein the fuel rack actuator maintains the start-up fuel injection position of the fuel rack until the compression ignition engine has started.

When cold-starting a compression ignition engine, it can take a period of time for the fuel rack to adjust to the start-up fuel injection position set by the fuel rack actuator. For example, in cold climates ice can build up internally which can reduce the response speed of the fuel rack. That is to say, the fuel rack may not adjust to the desired fuel injection quantity required to start the compression ignition engine instantaneously. Rather, in some cold climates the fuel rack may adjust to the desired start-up fuel injection positon over about 5-12 seconds for example.

According to the first aspect, the fuel rack is moved to the start-up fuel injection position during the warm up routine. By moving the fuel rack during the warm-up routine, the first aspect ensures that the fuel rack has moved to the start-up fuel injection position such that the compression ignition engine is able to receive the desired amount of fuel at the end of the warm-up routine. As such, once cranking of the compression ignition engine begins, the fuel injectors of the compression ignition engine (which are controlled by the fuel rack) are able to deliver the desired amount of fuel immediately. Consequently, the compression ignition engine may be successfully started after a relatively short cranking period following the end of the warm up routine. Accordingly, the method of the first aspect avoids unnecessary cranking of the compression ignition engine whilst the fuel rack is still adjusting the fuel injection amount to the desired level.

In some embodiments, if a predetermined time period elapses after the end of the warm up routine without the compression ignition engine starting, the fuel rack actuator is moved to a minimum fuel injection position. Accordingly, if the compression ignition engine is not started, or attempted to be started, or if non-zero engine speed is not detected within a predetermined time of the warm up routine ending, the fuel rack actuator may move the fuel rack to a minimum fuel injection position. In some embodiments, the minimum fuel injection position may correspond to zero fuel injection (i.e. the fuel injector is shut-off). In some embodiments, the predetermined time may be a time period of at least 20 seconds and/or a time period of no greater than 60, 50, 40 or 30 seconds. Accordingly, the method of the first aspect may shut off the fuel rack to prevent the fuel rack from being in a start-up fuel injection position for an extended period of time (without the compression ignition engine being started).

In some embodiments, prior to performing the warm up routine, the fuel rack actuator is in a minimum fuel injection position. As such, the fuel rack actuator and the fuel rack may be in a shut-off position prior to performing the method. Accordingly, the fuel rack may have to travel a substantial proportion of its full range of movement in order to reach the start-up fuel injection position. For example, the fuel rack may have to travel at least 80% of its full range of movement to reach the start up fuel injection position. In some embodiments, the start-up fuel injection position of the fuel rack is a maximum fuel injection position of the fuel rack.

In some embodiments, the fuel rack actuator comprises a solenoid. In some embodiments, the compression ignition engine may be a diesel engine. In particular, the compression ignition engine may be a direct injection diesel engine or an indirect injection diesel engine.

In some embodiments, the method is only performed when the temperature of the compression ignition engine is detected to be below a cold-start threshold. For example, the cold start threshold may be about 0° C., −5° C., −10° C., or −15° C. At such temperatures, the compression ignition engine may be particularly prone to the formation of ice on the fuel rack, which reduces the responsiveness of the fuel rack to changes in the position of the fuel rack actuator.

In some embodiments, following the start of the compression ignition engine, the fuel rack actuator position is governed by a closed loop controller. As such, it will be appreciated that the method of the first aspect controls the position of the fuel rack actuator temporarily during the method of starting the compression ignition engine. Once the compression ignition engine is started, the fuel rack actuator position may be governed by a closed loop controller, or any other suitable control methodology.

According to a second aspect of the disclosure, a compression ignition engine controller configured to perform a start-up routine for a compression ignition engine is provided. The controller is configured to:
   commence a warm-up routine by issuing a command to cause a glow plug of the compression ignition engine to preheat the compression ignition engine;
   during the warm-up routine, issue a command to actuate a fuel rack actuator of a fuel rack which controls the quantity of fuel to be injected into the compression ignition engine such that the fuel rack is in a start-up fuel injection position by the end of the warm up routine; and
   following the end of the warm up routine, issue a command to crank the compression ignition engine until the compression ignition engine starts,
   wherein the controller issues a command to maintain the start-up fuel injection position of the fuel rack until the compression ignition engine has started.

As such, it will be appreciated that the compression ignition engine controller of the second aspect may be used to perform the method of the first aspect when it is connected to a compression ignition engine. Thus, the compression ignition engine controller of the second aspect may include compression ignition engine controller features corresponding to any of the optional features discussed above in relation to the first aspect and any associated advantages.

In some embodiments, following the end of the warm up routine, the compression ignition engine controller is configured to wait to receive an input from an operator of the compression ignition engine controller before issuing the command to crank the compression ignition engine. As such, in the event that an operator commences the warm-up routine, but subsequently decides not to start the compression ignition engine, the compression ignition engine controller will not issue a command to crank the engine.

In some embodiments, if a predetermined time period elapses after the end of the warm up routine without the compression ignition engine starting, the compression ignition engine controller issues a command to move the fuel rack actuator to a minimum fuel injection position.

In some embodiments, the compression ignition engine controller only performs the start-up routine if the controller receives a signal that a temperature of the compression ignition engine is below a cold-start threshold. For example, the cold start threshold may be about 0° C., –5° C., –10° C., or –15° C.

In some embodiments, following the start of the compression ignition engine, the compression ignition engine controller is configured to govern the fuel rack actuator using a closed loop control strategy.

In some embodiments, the compression ignition engine controller only performs the start-up routine if the compression ignition engine controller receives a signal indicative that the engine speed is zero and a signal indicative that the oil pressure is below a predetermined threshold. As such, the compression ignition engine controller may perform a number of checks using other sensors coupled to the compression ignition engine controller to confirm that the compression ignition engine is at rest (i.e. not started) prior to commencing the warm up routine.

According to a third aspect of the disclosure, a compression ignition engine is provided. The compression ignition engine comprises a glow plug configured to heat the compression ignition engine, a fuel rack actuator configured to control the quantity of fuel to be injected into the compression ignition engine, and a compression ignition engine controller according to the second aspect.

As such, it will be appreciated that the compression ignition engine of the third aspect may be used to perform the method of the first aspect. Thus, the compression ignition engine of the third aspect may include features corresponding to any of the optional features discussed above in relation to the first aspect and second aspects and any associated advantages.

The compression ignition engine may be a diesel engine, for example a direct injection diesel engine or an indirect injection diesel engine. In some embodiments, the compression ignition engine may be configured to ignite fuels other than diesel. For example, the compression ignition engine may configured to ignite biodiesel, di-methyl ether (DME), jet propellent-8 (JP-8) or naphtha.

BRIEF DESCRIPTION OF THE FIGURES

A specific embodiment of the disclosure will now be described with reference to the following figures in which.

DETAILED DESCRIPTION

Figure 1:
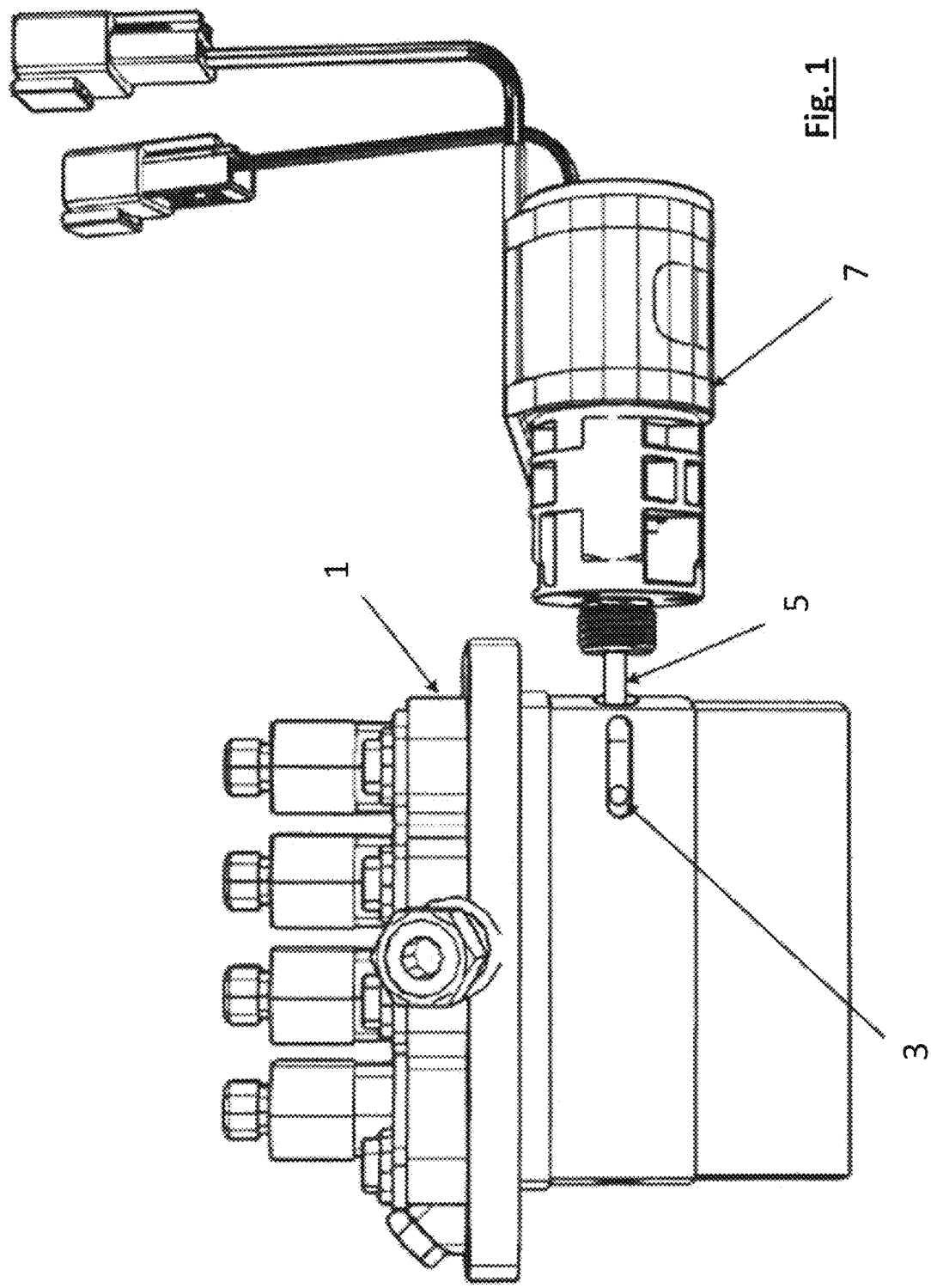
FIG. 1 shows a schematic diagram of a fuel rack and a fuel rack actuator in a minimum fuel injection position.

According to an embodiment of the disclosure, a compression ignition engine is provided. The compression ignition engine (not shown) comprises a fuel injection pump 1, a fuel rack 3, a fuel rack actuator 5, at least one glow plug (not shown), and a controller (not shown). FIG. 1 shows a schematic diagram of the fuel injection pump 1 including the fuel rack (fuel injection pump rack) 3 and the fuel rack actuator 5. It will be appreciated that the compression ignition engine of this disclosure may be provided as part of a vehicle, a boat, a generator or any other suitable machine. For the purposes of the following explanation, the compression ignition engine is considered to be part of a vehicle.

The fuel injection pump 1 of FIG. 1 is provided as part of a diesel compression ignition engine (a diesel engine). In particular, the compression ignition engine is an indirect injection diesel engine. It will be appreciated that in other embodiments, the compression ignition engine may be configured to ignite fuels other than diesel. For example, the compression ignition engine may configured to ignite biodiesel, di-methyl ether (DME), jet propellent-8 (JP-8) or naphtha.

The fuel rack 3 is configured to control the quantity of fuel to be injected by the fuel injection pump 1 into the compression ignition engine in each engine cycle. The position of the fuel rack 3 determines the quantity of fuel to be injected. As such, the fuel rack 3 can be moved from a minimum fuel injection position to a maximum fuel injection position (or any point in between) in order to control the quantity of fuel injected into the compression ignition engine 1. In the embodiment of FIG. 1, the fuel rack 3 is shown in the minimum fuel injection position.

For the purposes of starting the compression ignition engine, the fuel rack 3 may be set to a start-up fuel injection position. Such a position may correspond to a fuel injection quantity which is at least 80% of the maximum fuel injection quantity of the fuel rack (i.e. at least 80% of the fuel injection quantity set when the fuel rack is in the maximum fuel injection position). In some embodiments, the start-up fuel injection position may be the maximum fuel-injection position.

When the engine is at rest (i.e. not running), the fuel rack 3 may be set to the minimum fuel injection position. In some embodiments, the minimum fuel injection position may correspond to zero fuel injection such that the fuel rack 3 prevents the flow of fuel into the compression ignition engine. As such, when starting the compression ignition engine, the fuel rack 3 may travel from the minimum fuel injection position towards the maximum fuel injection position. Accordingly, starting the compression ignition engine may involve the fuel rack 3 travelling a substantial proportion of its movement range in order to reach the start-up fuel injection position.

In the embodiment of FIG. 1, the fuel rack 3 is resiliently biased against the fuel rack actuator 5. For example, the fuel rack 3 may be resiliently biased against the fuel rack actuator 5 by a spring (not shown). As such, the spring biases the fuel rack 3 against the fuel rack actuator 5 such that movement of the fuel rack actuator 5 results in a corresponding movement of the fuel rack 3.

In the embodiment of FIG. 1, the fuel rack actuator 5 comprises a solenoid 7. The solenoid 7 may be controlled by a signal from a controller (not shown) in order to set the position of the fuel rack actuator 5. The fuel rack 3 in turn moves based on the position of the fuel rack actuator 5. When the fuel rack actuator 5 moves, there may be some lag before the fuel rack 3 makes a corresponding change in position. In particular, when cold-starting the compression ignition engine, it can take a period of time for the fuel rack 3 to adjust to the position set by the fuel rack actuator 5. For example, in cold climates ice can build up internally which can reduce the response speed of the fuel rack 3. Accordingly, where the fuel rack 3 travels a substantial distance (relative to the overall movement range of the fuel rack 3), there may be some delay for the fuel rack 3 to move to the position set by the fuel rack actuator 5. For example, when cold-starting the compression ignition engine the fuel rack 3 may adjust to the desired start-up fuel injection positon over about 5-12 seconds (depending on the temperature of the fuel rack 3).

The fuel rack actuator 5 may be controlled by a controller (a compression ignition engine controller). The controller (not shown) may be any suitable processor for controlling one or more actuators of a compression ignition engine. For example, the controller may be an Engine Control Module and the like.

The compression ignition engine also comprises one or more glow plugs. The glow plugs are heating devices which are provided as part of the compression ignition engine to assist with the starting of the compression ignition engine. In the indirect injection diesel engine of FIG. 1, each glow plug may be provided in a respective swirl chamber of the diesel engine. Each glow plug may be controlled by the controller to heat a respective swirl chamber of the compression ignition engine. By pre-heating the swirl chamber prior to starting the compression ignition engine using the glow plugs, the compression ignition engine may be easier to start. Of course, it will be appreciated that in other embodiments, the compression ignition engine may be a direct injection compression ignition engine.

Next, a method of starting a compression ignition engine will be described with reference to FIGS. 1 to 4.

As discussed above, FIG. 1 shows a schematic diagram of a fuel injection pump 1 for a compression ignition engine where the fuel rack 3 and the fuel rack actuator 5 are each in a minimum fuel injection position. As such, FIG. 1 is a diagram representative of the compression ignition engine when the compression ignition engine is not running (i.e. the engine speed is zero).

When an operator of the compression ignition engine signals that the compression ignition engine is to be started, the controller may issue a command to commence a warm-up routine for the engine. The operator may signal that the compression ignition engine is to be started by turning a key (Key-on), or pushing a button on a dashboard or display of the vehicle for example.

Upon receiving a signal that the compression ignition engine is to be started, the controller issues a command to commence a warm up routine of the compression ignition engine. The warm up routine comprises issuing a command to cause at least one glow plug of the compression ignition engine to preheat the compression ignition engine. The duration of the warm up routine may depend on the temperature of compression ignition engine. For example, one or more temperature sensors connected to the compression ignition engine, or provided in the vicinity of the compression ignition engine may provide an indication of the compression ignition engine to the controller. Based on the temperature of the compression ignition engine, the controller may determine a suitable time period for the warm up routine. For example, when cold-starting a compression ignition engine, the controller may determine a warm up period of about 25 s is suitable. It will be appreciated that in some embodiments, the duration of the warm up routine may depend on the size of the compression ignition engine and/or the temperature of the compression ignition engine.

Figure 2:
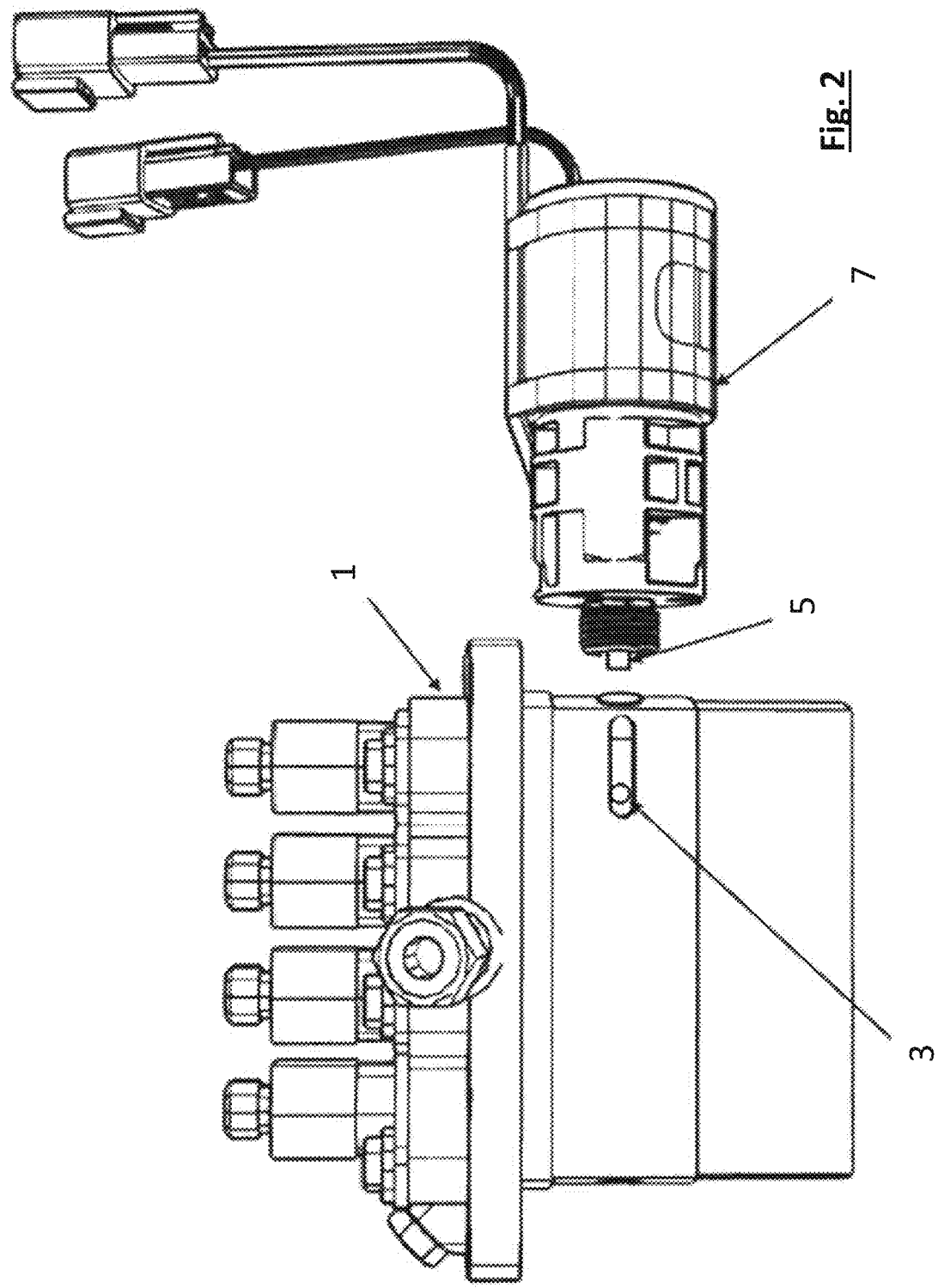
FIG. 2 shows a schematic diagram of the fuel rack of FIG. 1 where the fuel rack actuator has moved to the start-up fuel injection position.

In order to reduce the time taken to start the compression ignition engine, during the warm-up routine the controller issues a command to actuate the fuel rack actuator 5 for the fuel rack 3 which in turn controls the quantity of fuel to be injected into the compression ignition engine. The controller commands the fuel rack actuator 5 to move a start-up fuel injection position of the fuel rack actuator 5. FIG. 2 shows a schematic diagram of the compression ignition engine 1 shortly after the fuel rack actuator 5 has moved to the fuel injection position. As the fuel rack actuator 5 can move quicker than the fuel rack 3, the fuel rack 3 remains in the minimum fuel injection position.

Figure 3:
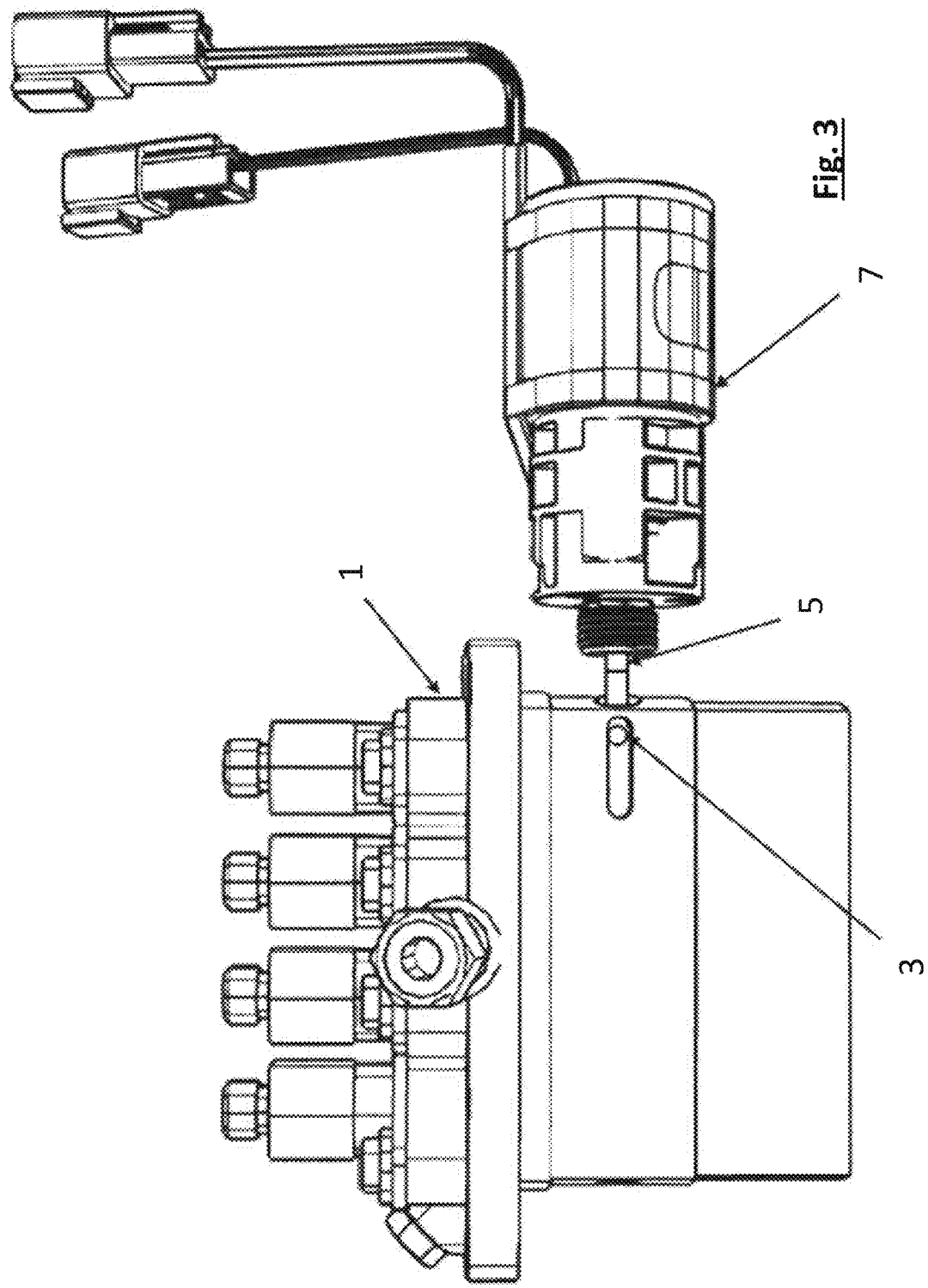
FIG. 3 shows a schematic diagram of a fuel rack and a fuel rack actuator in the start-up fuel injection position.

In response to the movement of the fuel rack actuator 5, the fuel rack 3 moves to a corresponding start-up fuel injection position. As discussed above, movements of the fuel rack 3 may lag behind the movement of the fuel rack actuator 1. For example, the fuel rack actuator 5 may move to the desired location in about 0.1 s. By contrast, the fuel rack actuator may take around 5 s to 12 s to move to the desired position. In particular, movement of the fuel rack 3 may be slower in colder conditions. In the embodiment of FIG. 1, the warm up routine is configured to last for about 25 s. Accordingly, the controller may issue a command to retract move the fuel actuator during the warm-up routine such that the fuel rack 3 is in a start-up fuel injection position by the end of the warm up routine. FIG. 3 shows a schematic diagram of the fuel injection pump 1 at the end of the warm up routine, by which point the fuel rack 3 has also moved to the start-up fuel injection position.

In some embodiments, the controller may issue the command to move the fuel rack actuator 5 at the start of the warm up routine. In some embodiments, the controller may issue the command to move the fuel rack actuator 5 during the warm up routine based on an expected movement time for the fuel rack 3. For example, where the controller expects the fuel rack to take about 12 seconds to move to the start-up fuel injection position, the controller may issue the command to the fuel rack actuator 5 about 12 seconds before the end of the warm up routine. In some embodiments, the controller may be configured with a predetermined expected movement time (e.g. about 12 seconds for the embodiment of FIG. 1). In some embodiments, the controller may determine an expected movement time based on the temperature of the compression ignition engine. That is to say, the controller may adjust the expected movement time to reflect that the movement time may change with temperature (i.e. to reflect that the fuel rack moves slower in colder temperatures). The relationship between temperature and expected movement time may be configured by a user depending on the characteristics of the combustion ignition engine 1. By ensuring that the fuel rack reaches the start-up fuel injection position at about the end of the warm up routine, the controller may avoid leaving the fuel rack in the start-up injection position for an extended period of time.

Once the warm up routine ends, the controller may send a signal to the operator of the compression ignition engine that the compression ignition engine is ready to attempt starting. For example, in some embodiments, the controller may send a signal to light a glow-plug signal on a dashboard of a vehicle during the warm up routine. Once the warm up routine ends, the controller may remove the glow-plug signal from the dashboard, thereby indicating that the compression ignition engine is ready to be started.

Following the end of the warm up routine, the controller issues a command to crank the compression ignition engine. The command to crank the engine may be issued in response to a further command from the operator.

The controller issues a command to crank the compression ignition engine until the compression ignition engine starts. During the cranking of the compression ignition engine, the controller issues a command to maintain fuel rack actuator 5 (and consequently the fuel rack 3) in the start-up fuel injection position. As the fuel rack 3 is already in position to allow the fuel injection pump 1 to deliver a fuel quantity suitable for starting the compression ignition engine (the start-up fuel injection quantity), the compression ignition engine may start relatively quickly. For example, in cold conditions, for example below 0° C., the compression ignition engine may start after around 5 to 10 s of cranking.

Following the start of the compression ignition engine, the fuel rack actuator 5 position may be governed by a closed loop controller. That is to say, once the compression ignition engine 1 is started in accordance with the method of this disclosure, the fuel rack actuator position may be governed by any suitable control scheme, such as a closed loop control scheme, the details of which are well known to the skilled person. Of course it will be appreciated that the position of the fuel rack actuator 5 during the warm up routine (e.g. in the start-up fuel injection position) may also be controlled by a closed loop control scheme.

Figure 4:
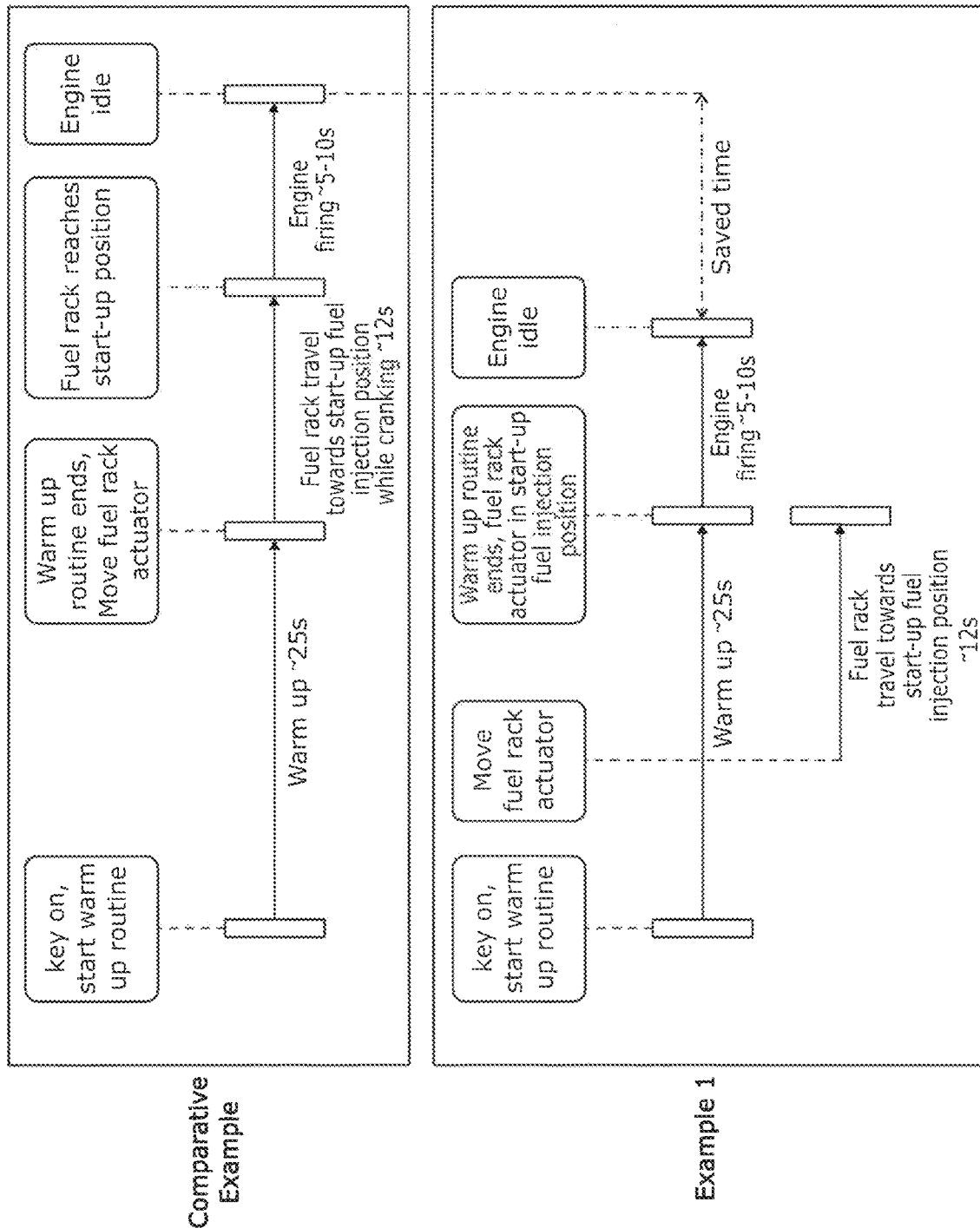
FIG. 4 shows a diagram of a method of starting a compressive ignition engine according to an embodiment of the invention and a comparative example.

FIG. 4 shows an example (Example 1) of a timescale for starting a compression ignition engine comprising the fuel injection pump 1 of FIG. 1 according to this disclosure and a Comparative Example. In the Comparative Example, a compression ignition engine is started under similar temperature conditions as the compression ignition engine of Example 1. In the Comparative Example, the fuel rack actuator 5 is not moved during the warm up routine. Rather, in the Comparative Example the fuel rack actuator 5 (and consequently the fuel rack 3) is moved during the cranking of the engine following the end of the warm up period. By only moving the fuel rack 3 once the warm up routine has completed, the method of the Comparative Example takes longer to start the compression ignition engine compared to Example 1. Furthermore, it will be appreciated that the total time spent cranking the engine in Example 1 is reduced relative to the total cranking time in the Comparative Example.

In some embodiments, it will be appreciated that following the end of the warm up routine, the operator may not issue a command to begin cranking the compression ignition engine immediately. Accordingly, if a predetermined time period elapses after the end of the warm up routine without the compression ignition engine starting, the controller may issue a command to move the fuel rack actuator 5 to a minimum fuel injection position.

INDUSTRIAL APPLICABILITY

According to this disclosure, a method of starting a compression ignition engine, a compression ignition engine controller and a compression ignition engine are provided. The embodiments of this disclosure are particularly applicable to the cold-starting of a compression ignition engine. That is to say, the embodiments of this disclosure may be advantageous when attempting to start a compression ignition engine which has not been operated for a while such that the compression ignition engine does not retain any residual heat from previous operation (i.e. a cold start). Embodiments of this disclosure may be particularly advantageous when the temperature of the compression ignition engine is below about 0° C.

In accordance with the description above, when cold-starting a compression ignition engine, it can take a period of time for the fuel rack 3 to adjust to the start-up fuel injection position set by the fuel rack actuator 5. For example, in cold climates ice can build up internally which can reduce the response speed of the fuel rack 3. Embodiments according to this disclosure account for this additional delay in order to reduce the overall time required to start a compression ignition engine.

According to embodiments of this disclosure, the fuel rack 3 is moved to the start-up fuel injection position during the warm up routine. By moving the fuel rack 3 during the warm-up routine, embodiments of this disclosure ensure that the fuel rack 3 is has moved to the start-up fuel injection position such that the compression ignition engine receives the desired amount of fuel at the end of the warm-up routine. As such, once cranking of the compression ignition engine begins, the fuel injection pump 1 is able to deliver the desired amount of fuel immediately. Consequently, the compression ignition engine may be successfully started after a relatively short cranking period following the end of the warm up routine. Accordingly, embodiments of this disclosure avoid unnecessary cranking of the compression ignition engine whilst the fuel rack 3 is still adjusting the fuel injection amount to the desired level.

According to this disclosure, the compression ignition engine may be a diesel engine, for example a direct injection diesel engine or an indirect injection diesel engine. In some embodiments, the compression ignition engine may be configured to ignite fuels other than diesel. For example, the compression ignition engine may configured to ignite bio-diesel, di-methyl ether (DME), jet propellent-8 (JP-8) or naphtha.

The invention claimed is:

1. A method of starting a compression ignition engine comprising:
   using a glow plug of the compression ignition engine to perform a warm up routine to preheat the compression ignition engine;
   during the warm up routine, actuating a fuel rack actuator of a fuel rack which controls the quantity of fuel to be injected into the compression ignition engine such that the fuel rack is in a start-up fuel injection position by the end of the warm up routine; and
   following the end of the warm up routine, cranking the compression ignition engine until the compression ignition engine starts,
   wherein the fuel rack actuator maintains the start-up fuel injection position of the fuel rack until the compression ignition engine has started.

2. The method of starting a compression ignition engine according to claim 1, wherein
   if a predetermined time period elapses after the end of the warm up routine without the compression ignition engine starting, the fuel rack actuator is moved to a minimum fuel injection position.

3. The method of starting a compression ignition engine according to claim 1, wherein
   prior to performing the warm up routine, the fuel rack actuator is in a minimum fuel injection position.

4. The method of starting a compression ignition engine according to claim 1, wherein
   the fuel rack actuator comprises a solenoid.

5. The method of starting a compression ignition engine according to claim 1, wherein
   the start-up fuel injection position of the fuel rack is a maximum fuel injection position of the fuel rack.

6. The method of starting a compression ignition engine according to claim 1, wherein
   the method is only performed when the temperature of the compression ignition engine is detected to be below a cold-start threshold.

7. The method of starting a compression ignition engine according to claim 6, wherein
   the cold start threshold is about 0° C.

8. The method of starting a compression ignition engine according to claim 1, wherein
   following the start of the compression ignition engine, the fuel rack actuator position is governed by a closed loop controller.

9. A compression ignition engine controller configured to perform a start-up routine for a compression ignition engine, the controller configured to:
   commence a warm-up routine by issuing a command to cause a glow plug of the compression ignition engine to preheat the compression ignition engine;
   during the warm-up routine, issue a command to actuate a fuel rack actuator of a fuel rack which controls the quantity of fuel to be injected into the compression ignition engine such that the fuel rack is in a start-up fuel injection position by the end of the warm up routine; and
   following the end of the warm up routine, issue a command to crank the compression ignition engine until the compression ignition engine starts,
   wherein the controller issues a command to maintain the start-up fuel injection position of the fuel rack until the compression ignition engine has started.

10. The compression ignition engine controller according to claim 9, wherein
    following the end of the warm up routine, the controller is configured to wait to receive an input from an operator of the compression ignition engine controller before issuing the command to crank the compression ignition engine.

11. The compression ignition engine controller according to claim 9, wherein
    if a predetermined time period elapses after the end of the warm up routine without the compression ignition engine starting, the compression ignition engine controller issues a command to move the fuel rack actuator to a minimum fuel injection position.

12. The compression ignition engine controller according to claim 9, wherein
    the compression ignition engine controller only performs the start-up routine if the controller receives a signal that a temperature of the compression ignition engine is below a cold-start threshold.

13. The compression ignition engine controller according to claim 12, wherein
    the cold start threshold is about −15° C.

14. The compression ignition engine controller according to claim 9, wherein
    following the start of the compression ignition engine, the compression ignition engine controller is configured to govern the fuel rack actuator using a closed loop control strategy.

15. The compression ignition engine controller according to claim 9, wherein
    the compression ignition engine controller only performs the start-up routine if the controller receives a signal indicative that the engine speed is zero and a signal indicative that the oil pressure is below a predetermined threshold.

16. A compression ignition engine comprising:
    a glow plug configured to heat the compression ignition engine;
    a fuel rack actuator configured to control the quantity of fuel to be injected into the compression ignition engine; and
    a compression ignition engine controller according to claim 9.

* * * * *